(12) United States Patent
Millner

(10) Patent No.: US 7,480,636 B2
(45) Date of Patent: Jan. 20, 2009

(54) DISTRIBUTION SYSTEM AND METHOD OF OPERATION THEREOF

(75) Inventor: Gary David Millner, Camps Bay (ZA)

(73) Assignee: Wraptech Limited, Douglas (IM)

( * ) Notice: Subject to any disclaimer, the term of this patent is extended or adjusted under 35 U.S.C. 154(b) by 888 days.

(21) Appl. No.: 10/472,715

(22) PCT Filed: Mar. 19, 2002

(86) PCT No.: PCT/IB02/00805

§ 371 (c)(1),
(2), (4) Date: Sep. 19, 2003

(87) PCT Pub. No.: WO02/077885

PCT Pub. Date: Oct. 3, 2002

(65) Prior Publication Data

US 2004/0107168 A1    Jun. 3, 2004

(30) Foreign Application Priority Data

Mar. 22, 2004   (GB)   ................................ 0107215.6

(51) Int. Cl.
*H04L 9/00*   (2006.01)
*H04N 7/167*   (2006.01)

(52) U.S. Cl. .................. 705/59; 713/165; 380/201; 380/203

(58) Field of Classification Search ................. None
See application file for complete search history.

(56) References Cited

U.S. PATENT DOCUMENTS 5,708,709 A  *  1/1998  Rose ........................... 705/59

(Continued)

FOREIGN PATENT DOCUMENTS

WO        96/24092 A2      8/1996

(Continued)

OTHER PUBLICATIONS

"Softwrap™—How it Works," www.softwrap.com/html/how.asp, archived Oct. 8, 2000.

(Continued)

*Primary Examiner*—Pramila Parthasarathy
(74) *Attorney, Agent, or Firm*—McDonnell Boehnen Hulbert & Bergoff LLP

(57) ABSTRACT

A system for administering the distribution of digitally distributable works, comprises an encapsulation facility operable to encapsulate a digitally distributable work with predetermined conditions of use to create an encapsulated work, and distribution means for distributing the encapsulated work from a transferor in possession thereof, to a transferee. The encapsulated work has a state which is alterable between an enabled state in which the digitally distributable work is unconditionally enabled for use, and a disabled state in which the digitally distributable work is disabled for use. The system also has a switching means operable to switch the state of the encapsulated work to be in the disabled state upon transfer of the digitally distributable work form the transferor to a transferee, and to be in the enabled state when the predetermined conditions of use are complied with by the transferee. An administration facility stores distribution data relating to a distribution chain of the digitally distributable work and distributes a portion of a predetermined purchase price paid by the transferee for the digitally distributable work to a number of the preceding transferors in the distribution chain.

18 Claims, 1 Drawing Sheet

U.S. PATENT DOCUMENTS

| | | | |
|---|---|---|---|
| 5,825,883 A * | 10/1998 | Archibald et al. ............. | 705/53 |
| 6,009,525 A | 12/1999 | Horstmann | |
| 6,067,416 A | 5/2000 | Fraser | |
| 6,134,593 A | 10/2000 | Alexander et al. | |
| 6,711,264 B1 * | 3/2004 | Matsumoto et al. ......... | 380/283 |
| 2002/0107809 A1 * | 8/2002 | Biddle et al. .................. | 705/59 |

FOREIGN PATENT DOCUMENTS

| | | |
|---|---|---|
| WO | 99/45491 A1 | 9/1999 |
| WO | 00/04674 A1 | 1/2000 |
| WO | 00/08909 A2 | 2/2000 |
| WO | 00/10071 A1 | 2/2000 |
| WO | 00/62265 A1 | 10/2000 |
| WO | 01/13310 A1 | 2/2001 |
| WO | 02/01330 A2 | 1/2002 |
| WO | 02/23314 A2 | 3/2002 |
| WO | 02/45316 A2 | 6/2002 |

OTHER PUBLICATIONS

"Softwrap™—The Cost Softwrap™," www.softwrap.com/html/cost.asp, archived Oct. 7, 2000 (obtained from www.archive.org).

"Softwrap™—FAQ's," www.softwrap.com/html/FAQSUser.asp, archived Oct. 28, 2000 (obtained from www.archive.org).

"Softwrap™—FAQ's" www.softwrap.com/html/FAQsauth.asp, archived Oct. 7, 2000 (obtained from www.archive.org).

"Softwrap™—Registration," www.softwrap.com/html/reg.asp, archived Oct. 17, 2000 (obtained from www.archive.com).

"Softwrap™—Author Registration," www.softwrap.com/html/author.asp, archived Oct. 17, 2000 (obtained from www.archive.org).

"Softwrap™—Register Software," www.softwrap.com/html/software.asp, archived Jan. 10, 2001 (obtained from www.archive.org).

"Softwrap™—Helpfiles," www.softwrap.com/html/helphtml/helpend.asp, archived Oct. 8, 2000 (obtained from www.archive.org).

"Softwrap™—Helpfiles," www.softwrap.com/html/helphtml/helpauth.asp, archived Dec. 13, 2000 (obtained from www.archive.org).

"Softwrap™—Sales and Account Info," www.softwrap.com/html/sales_login.asp, archived Dec. 4, 2000 (obtained from www.archive.org).

"Softwrap—Press Releases," www.softwrap.com/html/pressreleases.asp, archived Oct. 18, 2000 (obtained from www.archive.org).

Examiner's First Report from related Australian Patent Application No. 2002244872, dated Feb. 27, 2007.

\* cited by examiner

DISTRIBUTION SYSTEM AND METHOD OF OPERATION THEREOF

FIELD OF THE INVENTION

This invention relates to a system for administering the distribution of digitally distributable works and, more particularly, but not exclusively, to a system for administering the distribution of digitally encoded musical or software works that may be purchased and downloaded by a user from an on-line distribution facility. The invention extends to a method of operation of the distribution administration system.

In this specification, the term "digitally distributable work" will be taken to mean any copyrightable work which is encoded in a digital format, and which is distributable by means of a digital communication network.

BACKGROUND TO THE INVENTION

The illegal copying of digitally distributable works is widespread, resulting in a loss of royalty revenue to authors and owners of the copyright in such works, such as music companies, as well as recording artists whose performances are contained in these works.

One attempt to overcome this problem has been to impose a levy on blank recording media, such as cassette tapes, recordable compact disks, and the like, but this levy has been unsuccessful as a substitute for lost royalties.

The advent of the World Wide Web of the Internet has created a convenient global distribution channel for digital works. The applicant has developed an integrated Web application that allows music companies and distributors to securely distribute and sell their music over the Web. Although the Web application will be described with particular reference to the distribution of musical recordings, the application can be used to achieve secure distribution of any type of digitally distributable work.

In order to use the Web application, a distributor of a musical work is required to register as an authorised user of the application and to download a "wrapping software" application that is used to encapsulate the musical work that the distributor wishes to distribute. The musical work, which the distributor has encapsulated in this way, is registered on the Web application, together with a prescribed cost of a licence to use the musical work, and the duration of a free trial period offered to a would-be purchaser of a licence to use the musical work.

A would be purchaser of a licence to use a musical work is required to register as an authorised purchaser on the Web application, whereupon the encapsulated musical work can be downloaded and used without payment for the duration of the free trial period as determined by the distributor. Upon expiry of the free trial period, the musical work is rendered unusable by the wrapping software. If the would-be purchaser purchases a licence to use the musical work at any time before the expiry of the fee trial against payment of the cost of the licence fee, the musical work is rendered permanently usable by the wrapping software. An administration facility associated with the Web application settles the transaction by paying to the distributor the licence fee less a transaction fee.

Digitally distributable works may be disseminated the World Wide Web with complete accuracy and without any degradation in quality. This feature, whilst desirable, is problematic for owners of the copyright in such works as the works may be subsequently reproduced, after an initial lawful distribution thereof, as many times as desired with no degradation in the quality of the works. Thus, the applicant's Web application described above will be unable to prevent subsequent unauthorised reproduction of such a work after an initial authorised distribution thereof.

OBJECT OF THE INVENTION

It is an object of this invention to provide a system for the administration of licences relating to digitally distributable works, and to a method of operation thereof, which will, at least partially, alleviate the abovementioned difficulties.

SUMMARY OF THE INVENTION

In accordance with this invention there is provided a system for administering the distribution of digitally distributable works, comprising:

encapsulating means operable to encapsulate a digitally distributable work with predetermined conditions of use to create an encapsulated work having a state which is alterable between an enabled state in which the digitally distributable work is unconditionally enabled for use, and a disabled state in which the digitally distributable work is disabled for use;

distribution means for distributing the encapsulated work from a transferor in possession thereof, to a transferee;

switching means operable to switch the state of the encapsulated work to be in the disabled state upon transfer of the digitally distributable work, and to be in the enabled state when the predetermined conditions of use are complied with by the transferee; and an administration facility arranged to store distribution data relating to a distribution chain of the digitally distributable work and to distribute at least a portion of a predetermined purchase price paid by the transferee for the digitally distributable work to a number of the preceding transferors in the distribution chain.

Further features of the invention provide for the system to include a register of authorised purchasers of the digitally distributable work, for the conditions of use of the encapsulated work to require the transferee to register as an authorised purchaser of the digitally distributable work, for the distribution data to include an identity and contact details of all preceding transferors in the distribution chain of the digitally distributable work, for the encapsulated work to be initially distributed from a distribution facility to a first transferee in the distribution chain, for the remainder of the predetermined purchase price to be distributed to an operator of the distribution facility, and for a portion of the amount paid to the operator of the distribution facility to be distributed to an owner of the copyright in the digitally distributable work.

Still further features of the invention provide for the encapsulated work to also have a trial state in which the digitally distributable work is enabled for use or a predetermined trial period, for the switching means to be operable to also switch the state of the encapsulated work to be in the trial state upon transfer of the digitally distributable work, and for the switching means to switch the state of the encapsulated work to be in the disabled state when the predetermined conditions of use have not been complied with by the transferee within the predetermined trial period.

Yet further features of the invention provide for the digitally distributable work to be digitally encoded, for the digitally distributable work to include any one of a computer program, a sound recording, a literary work, an image or a cinematograph film, and for the distribution means to be an open communication network, preferably the World Wide Web of the Internet.

The invention extends to a method for administering the distribution of digitally distributable works, comprising the steps of:

encapsulating a digitally distributable work with predetermined conditions of use to create an encapsulated work having a state which is alterable between an enabled state in which the digitally distributable work is unconditionally enabled for use, and a disabled state in which the digitally distributable work is disabled for use;

distributing the encapsulated work from a transferor in possession thereof, to a ransferee;

switching the state of the encapsulated work to be in the disabled state upon transfer of the digitally distributable work;

switching the state of the encapsulated work to be in the enabled state when the predetermined conditions of use are complied with by the transferee; and storing distribution data relating to a distribution chain of the digitally distributable work and distributing at least a portion of a predetermined purchase paid by the transferee for the digitally distributable work to a number of the preceding transferors in the distribution chain.

There is further provided for the method to include the step of establishing a register of authorised purchasers of the digitally distributable work, for the conditions of use of the encapsulated work to require the transferee to register as an authorised purchaser of the digitally distributable work, for including in the distribution data an identity and contact details of all preceding transferors in the distribution chain of the digitally distributable work, for initially distributing the encapsulated work from a distribution facility to a first transferee in the distribution chain, for distributing the remainder of the predetermined purchase price to an operator of the distribution facility, and for distributing a portion of the amount paid to the operator of the distribution facility to an owner of the copyright in the digitally distributable work.

There is still further provided for the method to include the steps of switching the state of the encapsulated work to be in a trial state upon transfer of the digitally distributable work, in which the digitally distributable work is enabled for use for a predetermined trial period; and switching the state of the encapsulated work to be in the disabled state when the transferee has not complied with the predetermined conditions of use within the predetermined trial period.

BRIEF DESCRIPTION OF THE DRAWINGS

One embodiment of the invention is described below, by way of example only, and with reference to the accompanying drawing, in which.

DETAILED DESCRIPTION OF THE INVENTION

Figure 1:
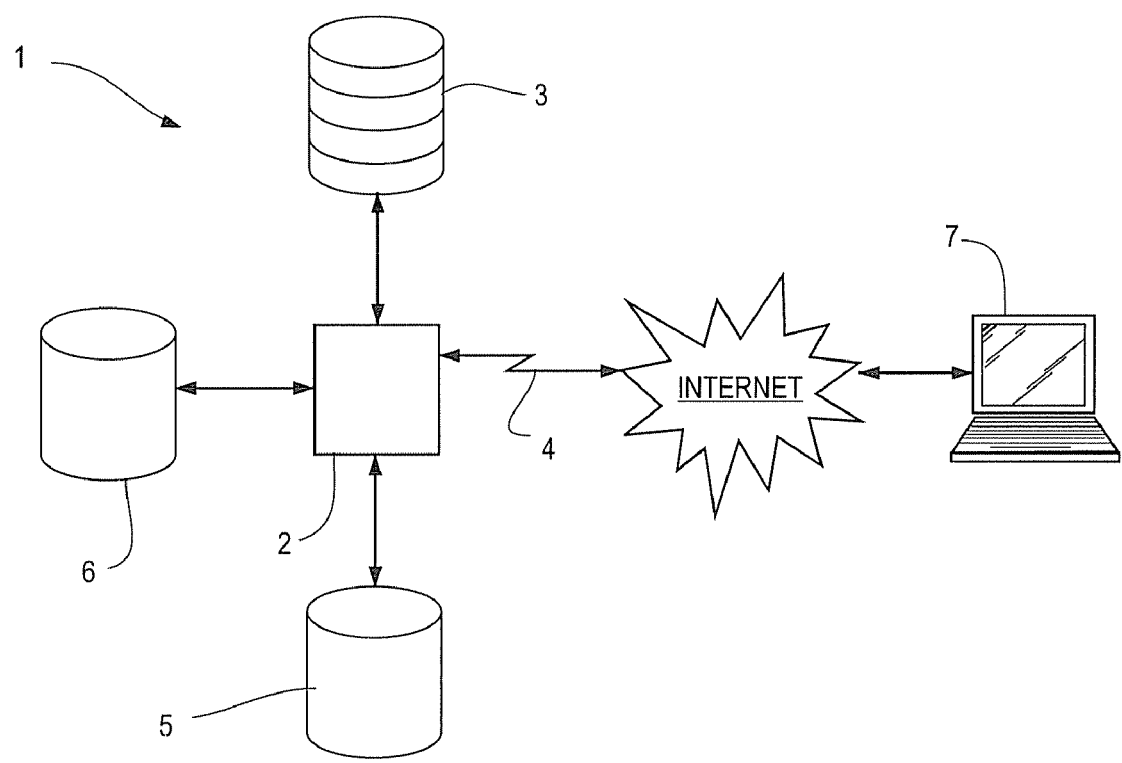
FIG. 1 is a schematic representation of a system for administering the distribution of digitally distributable works, according to the invention.

Referring to FIG. 1, a system for administering the distribution of digitally distributable works is indicated generally by reference numeral (1).

Although, in the description that follows, an embodiment of the invention will be described with particular reference to the distribution of musical works, it is to be clearly understood that the scope of the invention is not limited to this particular application, but extends, rather, to cover the administration of the distribution of any work which is digitally encoded such as, for example, any one or more of a computer program, a sound recording, a literary work, an image or a cinematograph film.

The system (1) includes an administration facility (2) in the form of an application Web server which is accessible through a communication channel (4), in this embodiment the World Wide Web of the internet, and a store (3) of digitally encoded musical works intended for distribution to persons who may wish to purchase a licence to use a copyrighted work from the store. For compactness, the musical works are stored in an MP3 format that is well known in the art. The musical works in the store (3) are encapsulated as will be described in greater detail in the description that follows. The system (1) also includes a user database (5), which is a register of authorised users of the system (1).

The system (1) includes, further, encapsulating means (6) in the form of an application software programme which is operable to encapsulate a musical work in the store (3), which is intended for distribution, with predetermined conditions of use to create an encapsulated work having a state is alterable between an enabled state in which the underlying musical work is enabled for use, a trial state in which the musical work is enabled for use for a predetermined trial period, and a disabled state in which the musical work is disabled for use.

In use, a first time user (7) of the system (1) wishing to purchase a licence for a particular musical work from the store (3) is required to access the administration facility (2) through an appropriate Web page on the World Wide Web and to register as an authorised user of the system. Once registered, the user (7) is able to browse through the musical works in the store (3) that are available for distribution, and to download, along the communication channel (4), a selected one of the musical works on approval.

The musical work that is downloaded by the user (7) is encapsulated, and is initially set to be in the trial state. The user (7) is able to use the underlying musical work as desired during the trial period. The conditions of use of the encapsulated work require the user (7) to pay prescribed licence fee for the administration facility (2) for a licence to use the musical work, before the expiry of the trial period. If the user (7) fulfils these conditions, the state of the encapsulated work is altered to be the enabled state, thereby allowing full and unrestricted use of the musical work by the licensee. Failure by the user (7) to pay the prescribed licence fee before the expiry of the trial period will result in the state of the musical work being altered to the disabled state, in which the musical work is rendered unusable.

The user (7) is able to freely transfer a copy of the downloaded encapsulated work to any other party by means of e-mail along the communication channel (4). When the downloaded encapsulated work is transferred in this manner, switching means in the form of application software in the encapsulated work will be activated to switch the state of the encapsulated work to the trial state, allowing the transferee in such a transfer to use the underlying musical work for the duration of the trial period. As above, the transferee is required to register as an authorised user of the system (1) and to pay the prescribed licence fee to the adininistration facility (2) for a licence to use the musical work, before the expiry of the trial period. If the transferee meets these conditions of use, the state of the encapsulated work is altered to an enabled state, thereby allowing full and unrestricted use of the musical work. If the transferee fails to register as an authorised user of the system (1), or to pay the prescribed licence fee before the expiry of the trial period, the state of the musical work will be altered to a disabled state, in which the musical work is rendered unusable.

The administration facility (2) has a transaction database that sores distribution data relating to a distribution chain of the musical work. The distribution data includes the identity and contact details of all preceding transferors of the musical work in the distribution chain. The licence transaction is settled by the administration facility (2) by distributing a portion of the predetermined licence fee paid by the transferee to a number, say two, of the preceding transferors in the distribution chain. The rationale for this distribution is that a transferor is compensated for his part in furthering the distribution of the musical work. The number of transferors to receive a portion of the licence fee can vary according to the needs of a particular application. The balance of the licence fee will be transferred to the owner of the rights in the musical work, less a transaction fee which is payable to an operator of the licence administration system (1).

Numerous modifications are possible to this embodiment without departing from the scope of the invention. In particular, the medium used for disseminating the musical work may be a closed communication channel instead of the Internet. Further, the system (1) may also include a register of authorised distributors of the musical works. Still further, the operation of the system (1) may be based on a virtual currency for making payment of and distributing the licence fees, with an accompanying interface for converting from real currency to virtual currency, and vice versa.

The invention therefore provides a system for the administration of licences relating to copyrighted works that will ensure that licensors of copyrighted works are able to lawfully distribute such works in exchange for a portion of a licence fee paid by parties to whom they distribute the works.

The invention claimed is:

1. A system for administering the distribution of digitally distributable works, comprising:
    encapsulating means operable to encapsulate a digitally distributable work with predetermined conditions of use to create an encapsulated work having an enabled state in which the digitally distributable work is unconditionally enabled for use, a disabled state in which the digitally distributable work is conditionally disabled for use, and a trial state in which the digitally distributable work is conditionally enabled for use for a predetermined trial period;
    distribution means for transferring the encapsulated work from a transferor in possession thereof, to a transferee, and for transferring the encapsulated work from the transferee to a subsequent transferee; and
    switching means operable to switch the encapsulated work in the trial state to be in the enabled state when the predetermined conditions of use are complied with by the transferee and to switch the encapsulated work from the enabled state to the trial state when the encapsulated work is thereafter transferred from the transferee to the subsequent transferee, wherein the predetermined conditions of use include at least one of (i) the transferee registering as an authorized purchaser of the digitally distributable work and (ii) the transferee paying a licence fee for a licence to use the digitally distributable work.

2. A system as claimed in claim 1 which includes a register of authorized purchasers of the digitally distributable work.

3. A system as claimed in claim 2 in which the predetermined conditions of use require the subsequent transferee to register as an authorized purchaser of the digitally distributable work after receipt thereof from the transferee.

4. A system as claimed in claim 1 which includes an administration facility arranged to store distribution data relating to a distribution chain of successive transferors of the digitally distributable work and to apportion at least a portion of a pre-established purchase price paid by the transferee for the digitally distributable work to a number of preceding transferors in the distribution chain.

5. A system as claimed in claim 4 in which the encapsulated work is initially transferred from a distribution facility.

6. A system as claimed in claim 5 in which the administration facilty apportions a remainder of the pre-established purchase price to an operation of the distribution facility and to an owner of the copyright in the digitally distributable work.

7. A system as claimed in claim 1 in which the switching means is operable to switch the state of the encapsulated work to be in the trial state upon transfer of the digitally distributable work to the transferee and to switch the state to be in the disabled state when the predetermined conditions of use have not been complied with by the transferee within the predetermined trial period.

8. A system as claimed in claim 1 in which the digitally distributable work includes any one of a computer program, a sound recording, a literary work or a cinematograph film.

9. A system as claimed in claim 1 in which the digitally distributable work is digitally encoded.

10. A system as claimed in claim 1 in which the distribution means is a digital communication network.

11. A method for administering the distribution of digitally distributable works, comprising the steps of:
    encapsulating a digitally distributable work with predetermined conditions of use to create an encapsulated work having an enabled state in which the digitally distributable work is unconditionally enabled for use, a disabled state in which the digitally distributable work is conditionally disabled for use, and a trial state in which the digitally distributable work is conditionally enabled for use for a predetermined trial period;
    transferring the encapsulated work from a transferor in possession thereof, to a transferee, and from the transferee to a subsequent transferee; and
    switching the encapsulated work from the trial state to the enabled state when the predetermined conditions of use are complied with by the transferee, and from the enabled state to the trial state when the encapsulated work is thereafter transferred from the transferee to the subsequent transferee, wherein the predetermined conditions of use include at least one of (i) the transferee registering as an authorized purchaser of the digitally distributable work and (ii) the transferee paying a licence fee for a licence to use the digitally distributable work.

12. A method as claimed in claim 11 which includes the step of establishing a register of authorized purchasers of the digitally distributable work.

13. A system as claimed in claim 12 in which the predetermined conditions of use require the subsequent transferee to register as an authorized purchaser of the digitally distributable work after receipt thereof from the transferee.

14. A method as claimed in claim 11 that includes a step of storing distribution data relating to a distribution chain of successive transferors of the digitally distributable work and apportioning at least a portion of a pre-established purchase price paid by the transferee for the digitally distributable work to a number of preceding transferors in the distribution chain.

15. A method as claimed in claim 14 that includes a step of initially transferring the encapsulated work from a distribution facility.

16. A method as claimed in claim 15 in which a remainder of the pre-established purchase price is apportioned to an operator of the distribution facility and to an owner of the copyright in the digitally distributable work.

17. A method as claimed in claim 11 that includes the further step of switching the state of the encapsulated work to be in the trial state upon transfer of the digitally distributable work to the transferee and switching the state to be in the disabled state when the predetermined conditions of use have not been complied with by the transferee within the predetermined trial period.

18. A method as claimed in claim 11 which includes the step of digitally encoding the digitally distributable work.

* * * * *